United States Patent
Shelton (10) Patent No.: US 7,903,367 B2
(45) Date of Patent: Mar. 8, 2011

(54) APPARATUS, SYSTEM, AND METHOD FOR REPEATABLE RUNOUT CANCELLATION

(75) Inventor: Boyd Norvell Shelton, North Ogden, UT (US)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/462,650

(22) Filed: Aug. 7, 2009

(65) Prior Publication Data

US 2009/0296266 A1    Dec. 3, 2009

(51) Int. Cl.
*G11B 5/596* (2006.01)

(52) U.S. Cl. .................................. 360/77.04

(58) Field of Classification Search ............ None
See application file for complete search history.

(56) References Cited

U.S. PATENT DOCUMENTS

| 5,550,685 | A | 8/1996 | Drouin |
|---|---|---|---|
| 5,949,605 | A | 9/1999 | Lee et al. |
| 6,310,742 | B1 | 10/2001 | Nazarian et al. |
| 6,487,035 | B1 | 11/2002 | Liu et al. |
| 6,661,599 | B1 | 12/2003 | Chen et al. |
| 6,922,596 | B2 | 7/2005 | Erickson et al. |
| 6,937,424 | B2 | 8/2005 | Chang et al. |
| 6,956,711 | B2 | 10/2005 | Hanson et al. |
| 2008/0112073 | A1* | 5/2008 | Shelton ............ 360/77.04 |

* cited by examiner

*Primary Examiner* — K. Wong
(74) *Attorney, Agent, or Firm* — Young & Thompson (57) ABSTRACT

An apparatus, system, and method are disclosed for the cancellation of repeatable runout signals. A signal processing module receives a position error signal and outputs a position compensated signal. A feed forward module receives the position error signal and outputs one or more cancellation signals to cancel one or more repeatable runout components from the position error signal when combined with the position compensated signal. A combining module combines the position compensated signal and the cancellation signals into a position command signal. A feedback module receives the position command signal and outputs the position error signal.

5 Claims, 6 Drawing Sheets

APPARATUS, SYSTEM, AND METHOD FOR REPEATABLE RUNOUT CANCELLATION

BACKGROUND OF THE INVENTION

1. Field of the Invention

This invention relates to the field of feed forward systems, and more particularly relates to feed forward servo systems in disk drives.

2. Description of the Related Art

Systems with repeatable runout (RRO) signals often use a feed forward servo system to cancel the position error caused by the RRO signals. RRO signals are predictable because of their periodic nature. RRO signals have many origins. In disk drives, imperfections in a disk assembly or the data storage media, misaligned or unbalanced disk platters, a tilt in the spindle motor, or eccentricities introduced into data tracks at servo write time may cause RRO signals. These or other defects may cause synchronized harmonic disturbances when the disk rotates. These defects are not related to track density, and therefore do not scale with the track density. This means that as track densities increase in modern disk drives, the RRO signals have more negative effects on the disk drive's ability to properly read, and write data from the disk. Methods that have been used in the past to cancel RRO signals are no longer fast enough or complete enough for modern track densities.

Both feed forward systems and feedback systems have been used to remove RRO signal components from input signals. Feed forward systems are also referred to as open loop systems. Feed forward systems typically comprise two or more signals added or subtracted to form an output. A cancellation signal is usually added or subtracted from another signal to eliminate some component of the other signal, like an RRO signal component, to maintain or achieve a specific system state. Feedback systems, conversely, are referred to as closed loop systems. In a feedback system, the output of the system is added or subtracted to the input signal, again to eliminate some component, like an RRO signal component, from the input signal to maintain or achieve a specific system state.

Feed forward systems can more completely cancel disturbances that are known and measurable than feedback systems can, but do not react well to novel disturbances. Feedback systems can cancel novel disturbances, but do not cancel the disturbance until the output of the system has already been affected. Feed forward systems also have a lower required sampling frequency than do feedback systems. This makes it possible to build an inexpensive large scale integration (LSI) chip. For example, a feed forward system with a sampling frequency of 2 kHz can have a canceling effect similar to a feedback system with a sampling frequency of 20 kHz. The gain of either system must be carefully set to avoid instability or oscillation due to overcorrection. While methods are well known in the art for determining an optimal gain for a feedback system, feed forward systems depend primarily on trial and error to determine the optimal gain. If the gain is too low, the feedback system is very slow. If the gain is too high, the system becomes unstable.

From the foregoing discussion, it should be apparent that a need exists for an apparatus, system, and method to remove RRO components from an input signal using a combined feed forward and feedback system that react as quickly and precisely as possible without going unstable. Beneficially, such an apparatus, system, and method would have an optimal gain for quick reaction to disturbances, without instability from overcorrecting.

SUMMARY OF THE INVENTION

The present invention has been developed in response to the present state of the art, and in particular, in response to the problems and needs in the art that have not yet been fully solved by currently available repeatable runout cancellation methods. Accordingly, the present invention has been developed to provide an apparatus, system, and method for cancelling repeatable runout that overcome many or all of the above-discussed shortcomings in the art.

The apparatus to cancel repeatable runout signals is provided with a plurality of modules configured to functionally execute the necessary steps of cancelling repeatable runout signals. These modules in the described embodiments include a signal processing module, a feed forward module, a combining module, and a feedback module.

The signal processing module, in one embodiment, receives a position error signal and outputs a position compensated signal. The signal processing module may be a position servo compensator.

The feed forward module, in a further embodiment, receives the position error signal and outputs one or more cancellation signals that are configured to cancel one or more repeatable runout components from the position error signal when combined with the position compensated signal. In one embodiment, the gain of the feed forward module is calculated using one or more mathematical equations. In a further embodiment, the mathematical equations comprise one or more feedback loop gain relationships. In another embodiment, the feed forward module also has one or more harmonic detectors to detect one or more repeatable runout components from the position error signal and to output a detected runout signal. In another embodiment, the feed forward module has one or more multipliers to output a product of the position error signal and one of the detected runout signals. The feed forward module may also have one or more integrators to integrate the output of one of the multipliers. In one embodiment, the feed forward module has one or more harmonic sources, each of which output one or more source signals at the phase of the position error signal and at the frequency of one or more of the repeatable runout components. One or more multipliers may each output one of the cancellation signals, each cancellation signal comprising the product of the output of one of the integrators and one of the source signals. The feed forward module may also have a sine stage and a cosine stage.

In a further embodiment, the combining module combines the position compensated signal and the cancellation signals into a position command signal. The combining module may subtract the cancellation signals from the position compensated signal to form the position command signal, or the combining module may add the cancellation signals to the position compensated signal to form the position command signal.

In one embodiment, the feedback module receives the position command signal and outputs the position error signal. The feedback module may be a plant with an actuator and an actuator controller. The plant may position the actuator relative to one or more disks in a disk drive based on the position command signal.

A system of the present invention is also presented to cancel repeatable runout signals. The system may substantially be embodied with the modules described above. In particular, the system, in one embodiment, also includes one or more data storage disks with one or more substantially circular data tracks and positioning data, a motor to rotate the data storage disks about an axis, an actuator coupled to a data head, and an actuator controller to receive a position command signal, to position the actuator and the data head relative to the data tracks on the data storage disks based on the position command signal, and to output the position error signal based on the positioning data.

A computer readable medium programmed for repeatable runout cancellation according to the present invention is also presented. The operations in the disclosed embodiments substantially include the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by an optical disk, a magnetic tape, a Bernoulli drive, a magnetic disk, a punch card, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
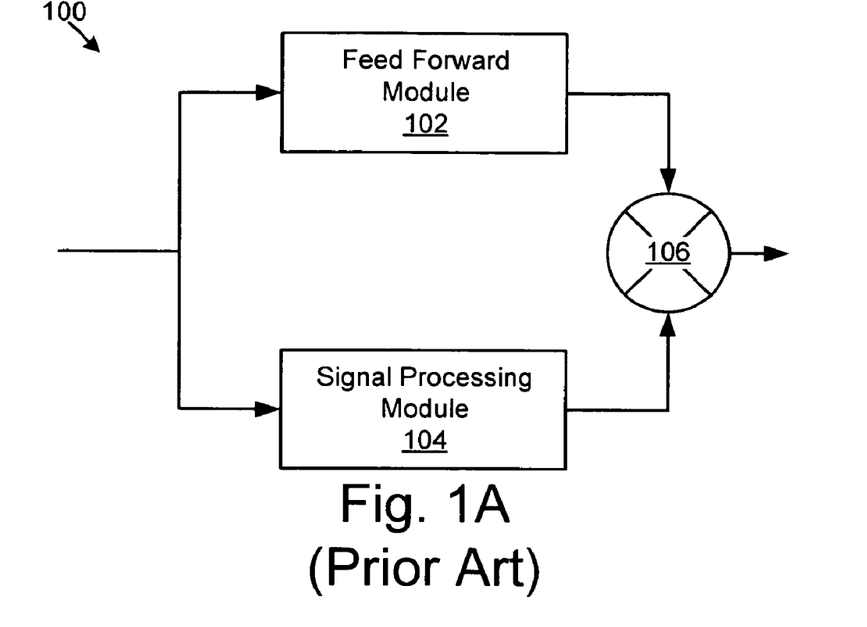
FIG. 1A is a schematic block diagram illustrating one embodiment of a feedback loop according to the related art.

FIG. 1A shows a basic feed forward or open loop system 100. As described above, feed forward systems typically comprise two or more signals added or subtracted to form an output. In FIG. 1A a feed forward module 102 and a signal processing module 104 each receive an input signal. The feed forward module 102 manipulates the input signal, and the manipulated signal is then added or subtracted from the output signal of the signal processing module 104 by a combining module 106 to eliminate some component from the input signal to maintain or achieve a specific system state.

Figure 1B:
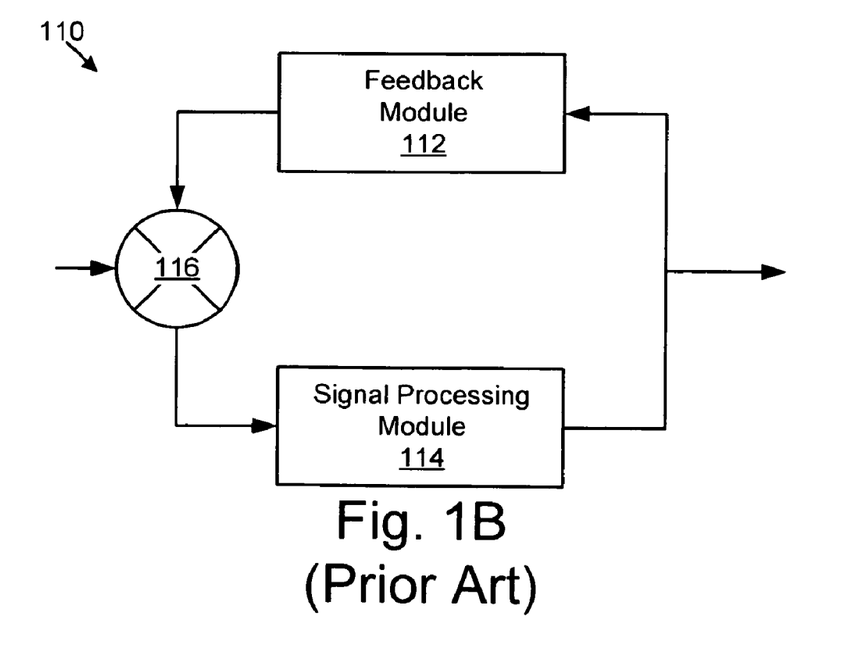
FIG. 1B is a schematic block diagram illustrating one embodiment of a feed forward loop according to the related art.

FIG. 1B shows a basic feedback or closed loop system 110. In the feedback system 110 the output of a signal processing module 114 is sent through a feedback module 112. The output of the feedback module 112 is then added or subtracted to the input signal by a combining module 116, again to eliminate some component from the input signal to maintain or achieve a specific system state.

Figure 2:
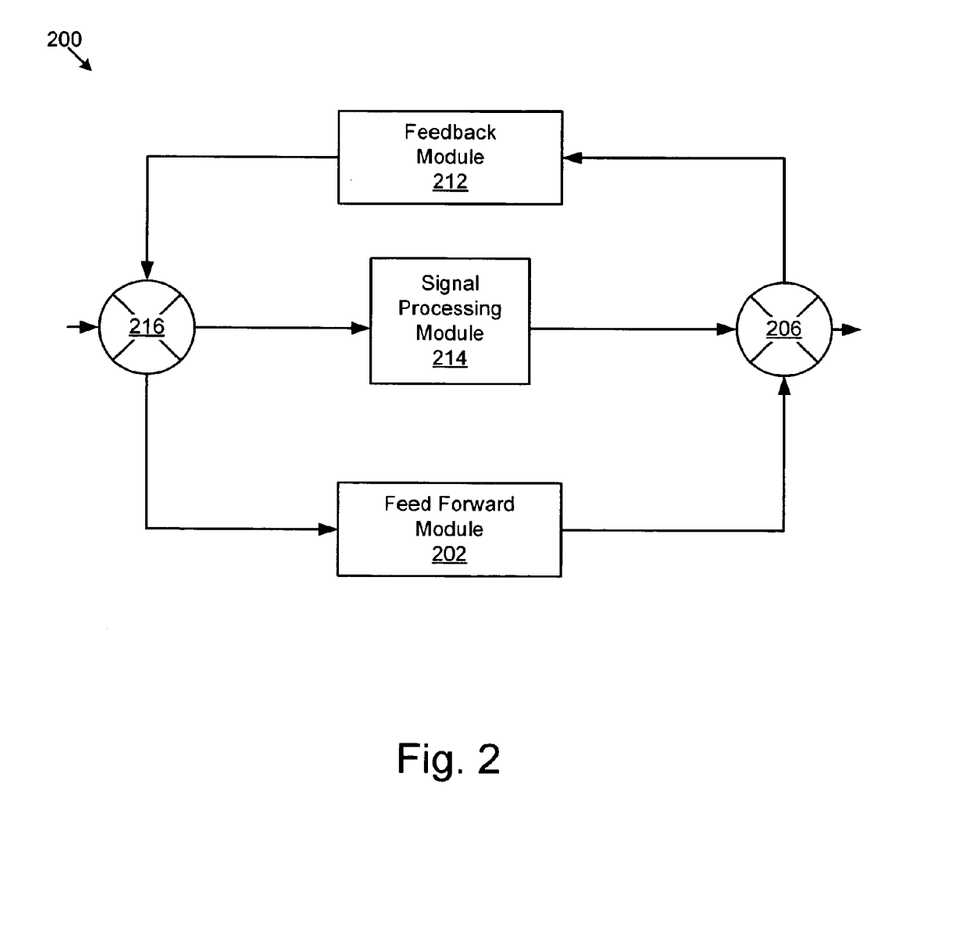
FIG. 2 is a schematic block diagram illustrating one embodiment of a repeatable runout cancellation system in accordance with the present invention.

FIG. 2 depicts one embodiment of a repeatable runout cancellation system 200. The system 200 retains the benefits of a conventional feed forward system while adding the desirable ability to calculate an optimal gain for the system according to known feedback system design methods when using a system model described in greater detail with regard to FIG. 5 and FIG. 6. In one embodiment, the system 200 has the modules found in the conventional feedback loop 100 of FIG. 1B, and the modules found in the conventional feed forward loop 110 of FIG. 1A. The system 200 may have a feed forward module 202, a feedback module 212, a signal processing module 214, and one or more combining modules 206, 216.

Figure 3:
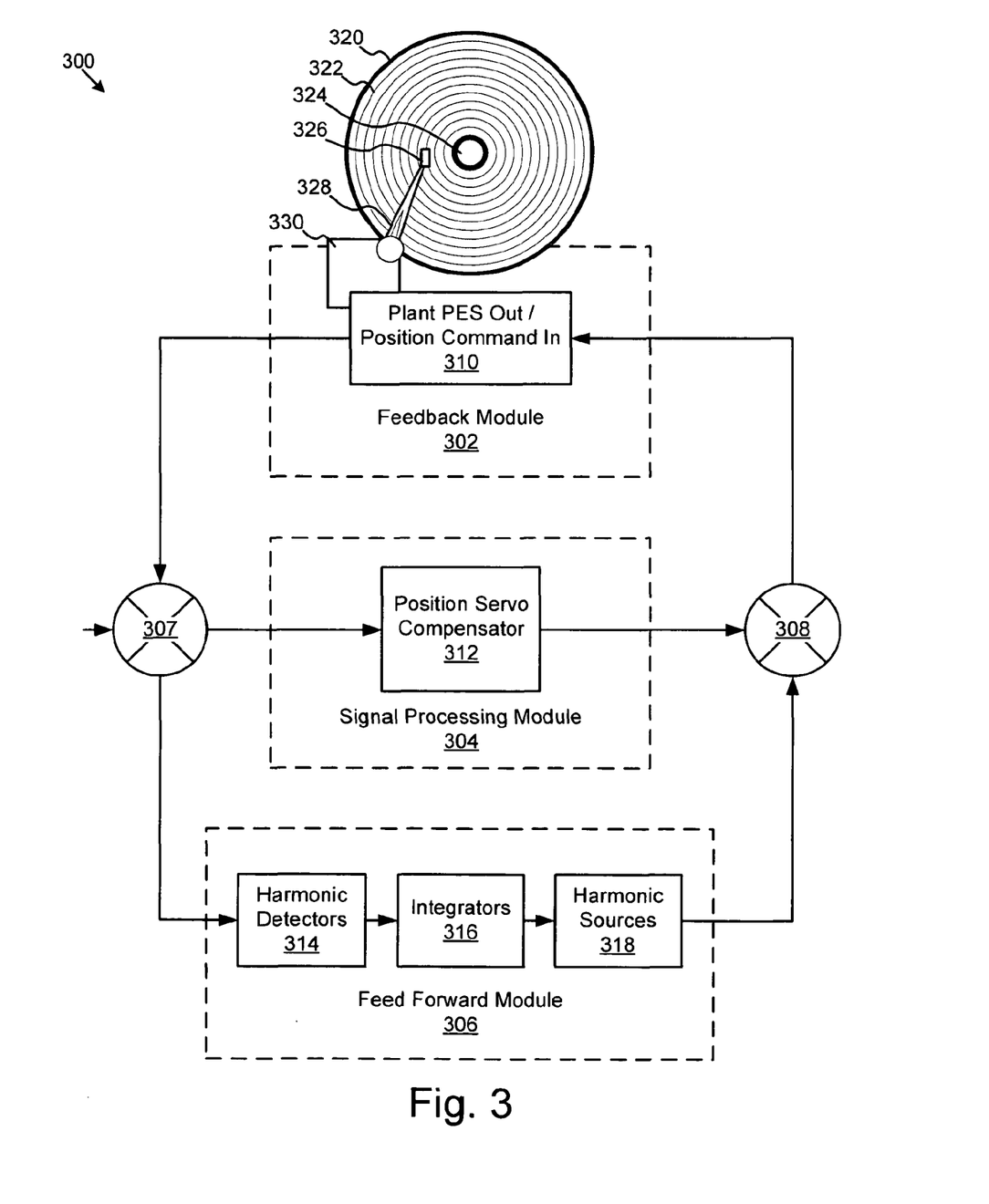
FIG. 3 is a schematic block diagram illustrating another embodiment of a repeatable runout cancellation system in accordance with the present invention.
Figure 4:
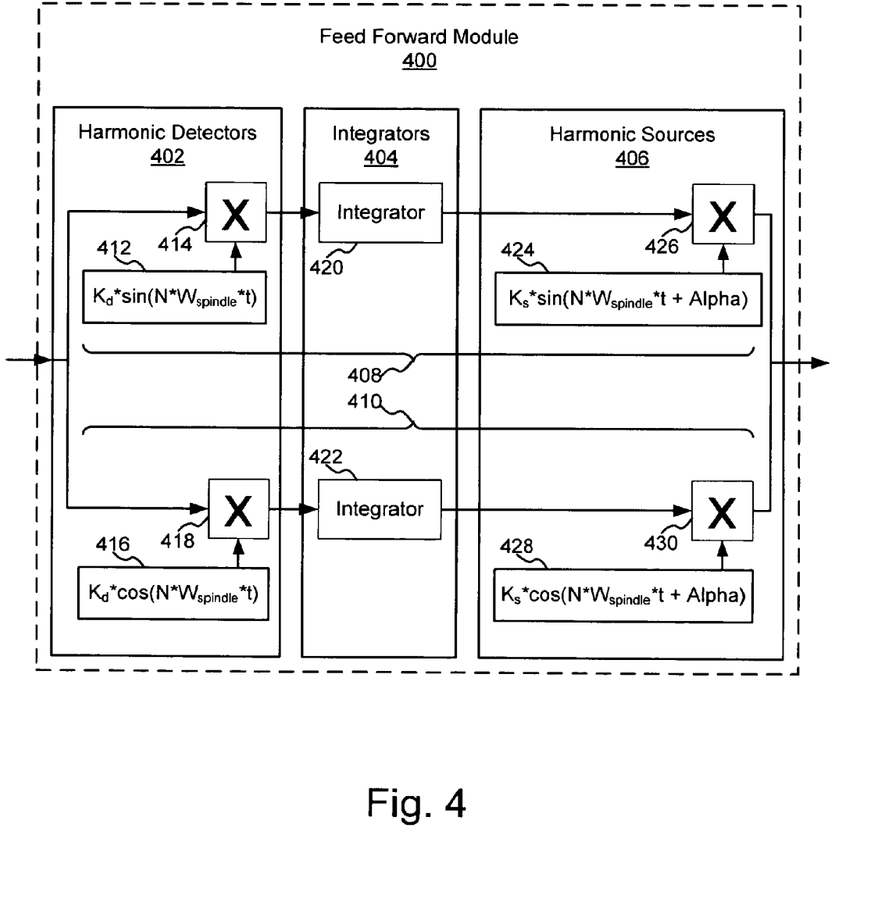
FIG. 4 is a schematic block diagram illustrating one embodiment of a feed forward module in accordance with the present invention.

The feed forward module 202 is discussed in greater detail with regard to FIG. 3 and FIG. 4. In general, the feed forward module 202 is configured to receive an input signal, to detect one or more harmonic disturbances in the input signal, and to output one or more cancellation signals configured to cancel the harmonic disturbances when the combining module 206 introduces the cancellation signals into the feedback system comprising the feedback module 212 and the signal processing module 214. The cancellation signals may be signals substantially similar to the harmonic disturbances, the combining module 206 subtracting the cancellation signals from another signal, or the cancellation signals may be substantially inverse to the harmonic disturbances, the combining module 206 adding the cancellation signals to another signal. In one embodiment, the input signal is a position error signal (PES). In another embodiment, the input signal is a PES combined with one or more other input signals. The combining module 216 may combine the PES with the one or more other input signals. In a further embodiment, the feed forward module 202 comprises one or more harmonic detectors, one or more integrators, and one or more harmonic sources.

In one embodiment, the feedback module 212 is oriented in a feedback loop configuration with the other modules in system 200. The feedback module 212 may be configured to receive the output of the system 200 from the combining module 206 as an input, and to output a signal that is returned as a feedback signal to the input of the system 200. In one embodiment, the feedback module 212 receives is a command signal, or a position command signal. In a further embodiment, the feedback module 302 generates a PES. As described above, the PES may be sent as an input to the feed forward module 202. In one embodiment, the feedback module 212 is a plant, as is generally known in the art, with an actuator controller and an actuator. The plant may be part of an optical, floppy, or hard disk drive, or the plant may be part of another system involving RRO signals. A further embodiment of the feedback module 212 is also discussed below with regard to FIG. 3.

In one embodiment, the system 200 also has a signal processing module 214. The signal processing module 214 receives an input signal from the input of the system 200, and outputs a processed signal. The signal processing module 214 may receive the same signal as the feed forward module, or an equivalent signal. The received signal may be a PES, as described above. The received signal may be the output of the feedback module 212, or the output of the feedback module 212 combined with one or more system inputs. The combining module 216 may be configured to combine the output of the feedback module 212 with the one or more system inputs, and to output a signal to the signal processing module 214. The combining module 216 may also output the signal or a substantially similar signal to the feed forward module 202. In one embodiment, the signal processing module 214 is a position servo compensator, as is generally known in the art, and the processed signal is a position compensated signal. A further embodiment of the signal processing module 214 is described below with regard to FIG. 3.

In one embodiment, the system 200 has one or more combining modules 206, 216. The combining modules 206, 216 may be summers, multipliers, or other signal combiners. One or more inputs to the combining modules 206, 216, may also have inverters. The first combining module 206 may be configured to combine the output signal of the feed forward module 202 with the output signal of the signal processing module 214. The first combining module 206 may output a first combined signal to an input of the feedback module 212. The signal that the first combining module 206 outputs may be a position command signal. In another embodiment, the first combining module 206 may also have multiple outputs, which may be sent to other systems or other modules in system 200.

In one embodiment, the system 200 also has a second combining module 216. The second combining module 216 may be configured to combine the output of the feedback module 212 with one or more input signals, and to send the combined signal to the signal processing module 214 and the feed forward module 202. The one or more input signals may communicate or represent a desired or target position or system state. Alternatively, the combining module 216 may split the output signal from the feedback module 212 and send it to the signal processing module 214 and the feed forward module 202 without combining the signal with another input signal.

FIG. 3 shows another embodiment of a repeatable runout cancellation system 300 for illustration purposes. The system 300 has a feedback module 302, a signal processing module 304, and a feed forward module 306 that may be substantially similar to the feedback module 212, the signal processing module 214, and the feed forward module 202 of FIG. 2. The system 300 may also have one or more combining modules 307, 308. In one embodiment, the feed forward module 306 has a repeatable spindle speed harmonic detector stage 314, one or more integrators 316, and a spindle speed harmonic source stage 318. The feed forward module is discussed in more detail with regard to FIG. 4.

In one embodiment, the feedback module 302 comprises a plant 310 that receives a position command signal in, and outputs a PES. As described above, the plant 310 may comprise an actuator controller 330 and an actuator 328, and may be part of an optical, floppy, or hard disk drive, or part of another system involving RRO signals. The actuator 328 may be coupled to a data head 326. The data head 326 may be a read head, a write head, or a read/write head. The data head 326 may be a magneto-resistive head, an optical head, a transducer head, or of another head type. In one embodiment, the feedback module 302 also comprises one or more data storage disks 320. The data storage disks 320 may have one or more substantially circular data tracks and positioning data 322. A motor 324, which may be a spindle motor or another motor type, may be configured to rotate the data storage disks 320 about an axis. The plant 310 may use the position command signal to determine a position for the actuator 328 and the data head 326, and to place the actuator 328 and the data head 326 relative to the data tracks 322. The plant 310 may use the position data 322 to generate the PES. The position data 322 may be a dedicated servo, an embedded servo, a buried servo, another servo type, or another position indicator type.

In one embodiment, the signal processing module 304 comprises a position servo compensator 312, as is generally known in the art. The position servo compensator 312 may receive the PES that the plant 310 generated as an input. The position servo compensator 312 may output a position compensated signal based on the PES input. The position compensated signal may be configured to correct a position error denoted by the PES.

In one embodiment, the feed forward module 306 comprises one or more harmonic detectors 314, one or more integrators 316, and one or more harmonic sources 318. The feed forward module 306 is discussed in more detail with regard to FIG. 4. In general, the harmonic detectors 314 detect one or more RRO signals, the integrators 316 integrate the detected RRO signals, and the harmonic sources 318 provide or source cancellation signals configured to cancel the detected RRO signals. In one embodiment, the output of the integrators 316 are an accumulation of the RRO signals that the harmonic detectors 314 have detected.

In one embodiment, the combining modules 307, 308 are substantially similar to the combining modules 216, 206 of FIG. 2. In one embodiment, the combining module 308 is a summer configured to output the sum of the outputs from the signal processing module 304 and the feed forward module 306. In a further embodiment, the output of the combining module 308 comprises the position command input of the feedback module 302, as described above.

The feedback module 302, the signal processing module 304, and the combining modules 307, 308 comprise a closed position control loop. Referring to FIG. 3:

$$\underset{(302)}{\phantom{F}}\underset{(302)}{\phantom{F}}\underset{(304)}{\phantom{F}} \qquad \text{Equation 1}$$
$$Fpcl(s) = \text{Plant}/(1 - \text{Plant} * \text{Compensator})$$

Fpcl(s) represents the feedback position control loop. A closed loop stability analysis, as is known in the art, can now be used to determine the optimum gains and stability of the closed position control loop portion of the system 300.

FIG. 4 illustrates one embodiment of a feed forward module 400 that may be substantially similar to the feed forward module 306 of FIG. 3. In one embodiment, the feed forward module 400 has one or more harmonic detectors 402, one or more integrators 404, and one or more harmonic sources 406. In another embodiment, the harmonic detectors 402, the integrators 404, and the harmonic sources 406 are disposed in a sine path 408 and a cosine path 410 configuration.

In one embodiment, the harmonic detectors 402 are configured to detect one or more RRO signals or RRO components found in the input signal. The harmonic detectors 402 may have one or more sine harmonic detectors 412 and one or more cosine harmonic detectors 416. If the harmonic detectors 402 have a sine detector 412 and a cosine detector 416, all possible phases of the input signal are detected in amplitude and phase. This may be similar to using a Fourier series to measuring the amplitude and phase of a particular frequency component of an unknown signal. The harmonic detectors 402 may be standard harmonic detectors as are generally known in the art. One or more multipliers 414, 418 may multiply the signals that the harmonic detectors detected with the input PES, and output the product of the multiplication to the integrators 404.

In one embodiment, the integrators 404 are configured to integrate the output of the harmonic detectors 402. By integrating the output signals from the harmonic detectors 402, the integrators 404 output a dynamic measure of the system signal content of the harmonic of interest which is in phase with the respective function 412, 416. In one embodiment, there are multiple integrators 420, 422 corresponding to the multiple harmonic detectors 412, 416.

In one embodiment, the harmonic source stage 406 provides the source signals to eliminate or reduce the detected RRO signals. The harmonic sources 406 may receive the output of the integrators 404 as an input. Additionally, the harmonic sources 406 may receive other signals or data from the harmonic detectors 402. The harmonic sources 406 may calculate, build, source, or create the source signals based on the other signals or data. In one embodiment, the other signals or data comprise phase and frequency data.

In one embodiment, the feed forward module 400 comprises a sine path 408, and a cosine path 410. The sine path 408 and the cosine path 410 may work independently, each working on the portion of the input signal that is in phase with the respective detector wave 412, 416. The sine path 408 may comprise the harmonic detector 412, the multiplier 414, the integrator 420, the harmonic source 424, and the multiplier 426. The cosine path 410 may comprise the harmonic detector 416, the multiplier 418, the integrator 422, the harmonic source 428, and the multiplier 430.

In one embodiment, the gain of the harmonic detector stage 402 for the Nth harmonic of the spindle speed is:

$$\sin(N*\text{Wspindle}*t)*Kd*\sin(N*\text{Wspindle}*t) \qquad \text{Equation 2}$$

Which simplifies to:

$$Kd*\sin 2(N*\text{Wspindle}*t) \qquad \text{Equation 3}$$

Wspindle is the frequency of the spindle rotation, and Kd is the gain of the harmonic detector 402. Because the sine path 408 and the cosine path 410 work independently, each working on the part of the input signal that is in phase with the respective detector wave 412 or 416 as described above, in one embodiment the output of each of the integrators 404 is:

$$\int \cos(w \cdot t) \cdot (\cos(w \cdot t)) dt = \frac{1}{4 \cdot w} \cdot \cos(2w \cdot t) + \frac{1}{2} \cdot t \qquad \text{Equation 4}$$

$$\int \sin(w \cdot t) \cdot (\sin(w \cdot t)) dt = \frac{-1}{4 \cdot w} \cdot \cos(2w \cdot t) + \frac{1}{2} \cdot t \qquad \text{Equation 5}$$

According to equations 4 and 5, the output of the integrators is made of two parts, a wave of twice the frequency of interest attenuated by a factor of 1/(4*w) and an integrating ramp of ½*t, where w is the frequency and t is time. The integrating ramp dominates the control signal. Using Kd as the gain of the harmonic detectors 402, and Ks as the gain of the harmonic sources 406, the combined gain Kt for the harmonic detectors 402 and the harmonic sources 406 is:

$$Kt=\tfrac{1}{2}*Kd*Ks \qquad \text{Equation 6}$$

The spindle speed harmonic sources 406 have a phase shift of Alpha shown in FIG. 4. The phase shift Alpha is the phase necessary to give the source signals 424, 428 the same phase as the phase of the input signal after it passes through the position servo closed loop system 308, 310, 312 of FIG. 3. In other words, it is the negative of the phase shift seen on the closed loop system 308, 310, 312 at the frequency being canceled. This insures an optimum phase relationship for cancellation, and insures that the cancellation signals require no phase shift from the PES input into the feed forward module 400. In one embodiment, the multipliers 426, 430 multiply each of the source signals 424, 428 respectively with the output of the integrators 404.

Figure 5:
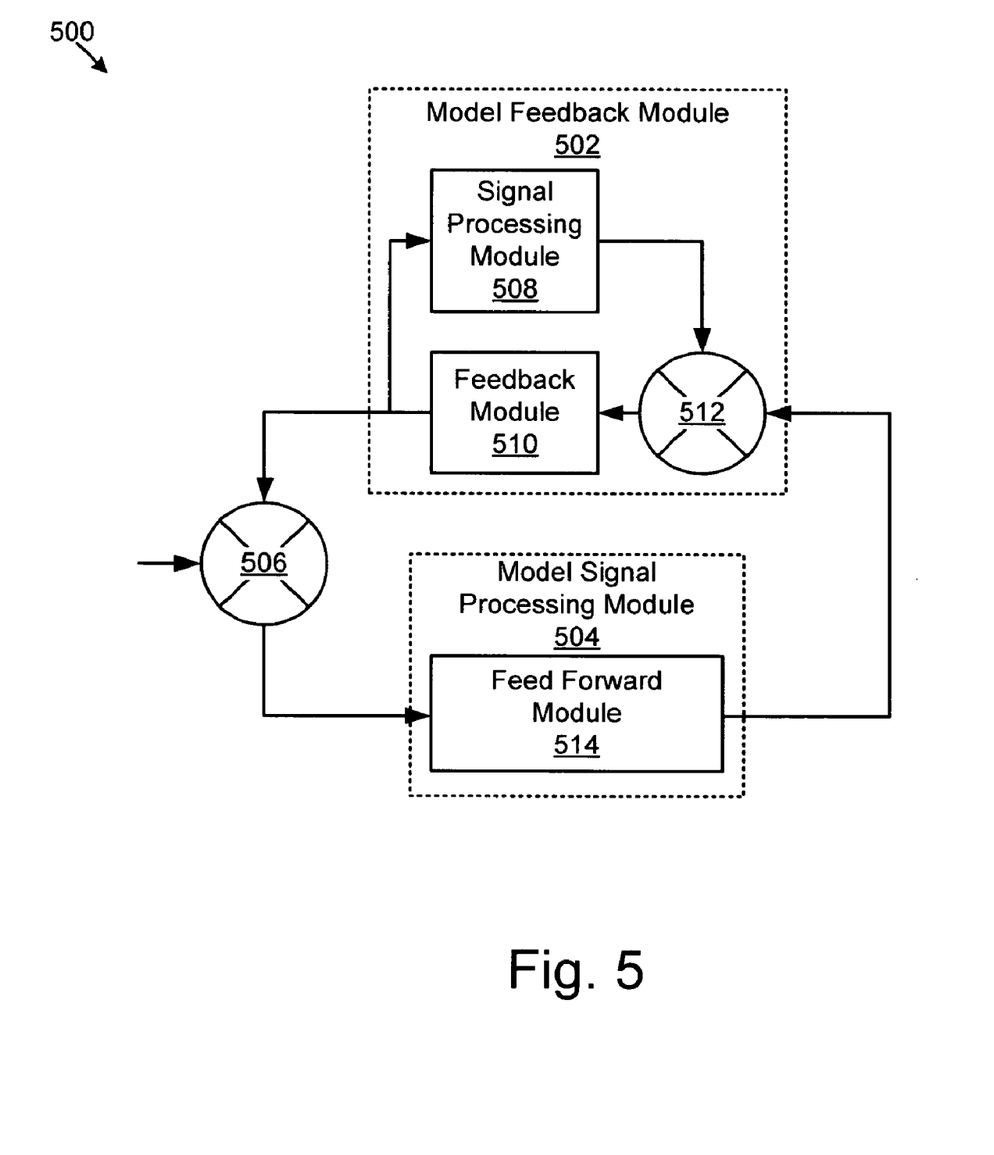
FIG. 5 is a schematic block diagram illustrating one embodiment of a repeatable runout cancellation system model in accordance with the present invention.

FIG. 5 illustrates one embodiment of a repeatable runout cancellation system model that may be used to calculate an optimal gain for the system 500. Because the gain of the closed loop portion of the system 300, the gain of the harmonic detectors 314, and the gain of the harmonic sources 318 can be calculated as described above, an optimal gain can be set by choosing a gain for the integrators 316, by changing the gain of another part of the system 300, or by other methods generally known in the art. The system model 500 may model a system that is substantially similar to the system 200 of FIG. 2, or to the system 300 of FIG. 3. The system model 500 may be a feedback system similar to the prior art system 110 of FIG. 1B.

In the system model 500, the model feedback module 502 may comprise a signal processing module 508, a feedback module 510, and a combining module 512. The model feedback module 502 may be substantially similar to the closed loop or feedback portion of the system 200 of FIG. 2, or to the closed loop or feedback portion of the system 300 of FIG. 3. In one embodiment, the gain for the model feedback module 502 is calculated according to Equation 1 or according to other standard gain calculation methods. Modeling the feedback loop portion of the repeatable runout cancellation system as the model feedback module 502 reduces the system from a combined feedback and feed forward system to a single model feedback loop 500.

The model signal processing module 504 may comprise a feed forward module 514. The feed forward module 514 may be substantially similar to the feed forward module 202 of FIG. 2, to the feed forward module 306 of FIG. 3, or to the feed forward module 400 of FIG. 4. Modeling the feed forward module 514 as the model signal processing module 504 completes the model feedback loop 500. In one embodiment the model feedback loop 500 also comprises a combining module 506. The combining module 506 may combine the output of the model feedback module 502 with one or more other signals and output the combined signals to the model signal processing module 504.

Modeling the combined feedback and feed forward repeatable runout cancellation system as the feedback loop 500 allows a more precise calculation and optimization of system gain without causing the system 500 to go unstable. Trial and error methods for selecting system gain yielded response times that were not fast enough for modern applications, for example in disk drives with high track densities. Methods are well established, however, for calculating the optimal gain of a feedback loop. Because the gain of the model feedback module 502 can be calculated as described above, an optimal gain can be chosen for the model signal processing module 514. Calculating an optimal gain using known feedback loop theory and mathematical equations provides the benefits of a combined feedback and feed forward cancellation system, and the added benefit of a faster, more precise reaction time without the risk of going unstable.

Figure 6:
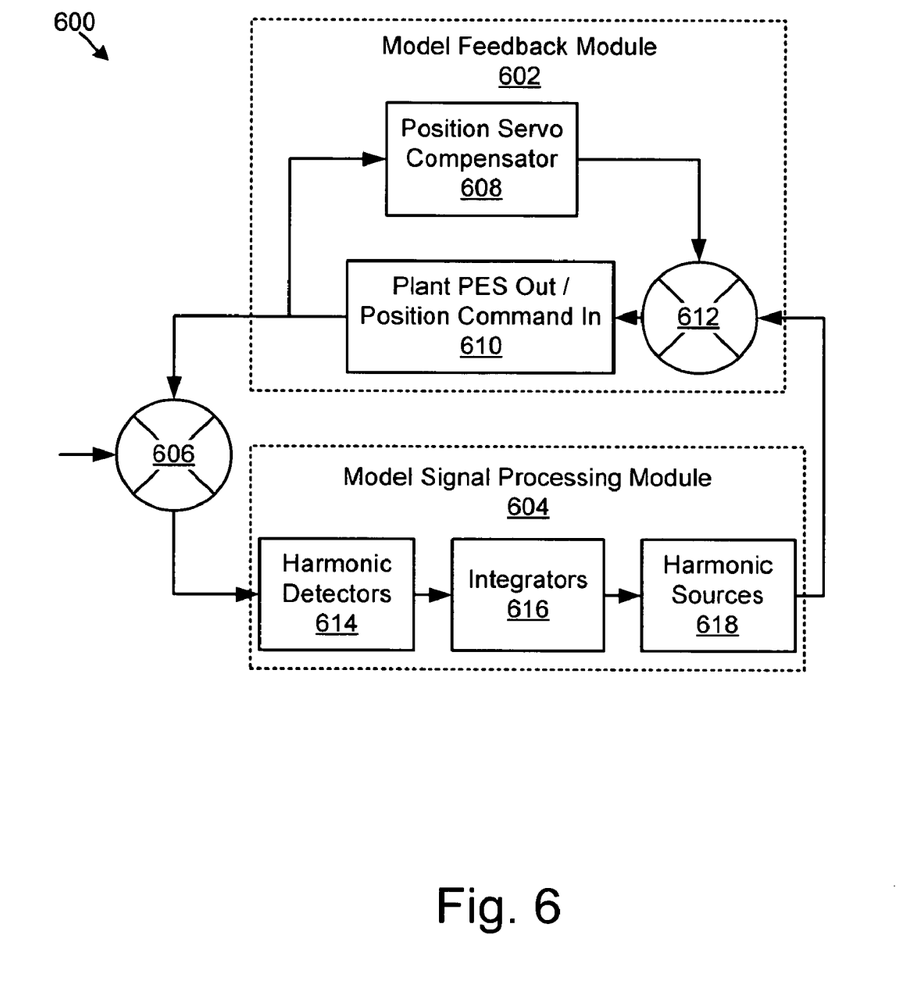
FIG. 6 is a schematic block diagram illustrating another embodiment of a repeatable runout cancellation system model in accordance with the present invention.

FIG. 6 illustrates another embodiment of a repeatable runout cancellation system model that may be used to calculate an optimal gain, for example purposes. The system model 600 may be substantially similar to the system model 500 of FIG. 5. In one embodiment, the model feedback module 602 comprises a position servo compensator 608, a plant 610, and a combining module 612. The position servo compensator 608 and the plant 610 may be substantially similar to the position servo compensator 312 and the plant 310 of FIG. 3, comprising a feedback loop with the combining module 612.

In one embodiment, the model signal processing module 604 comprises harmonic detectors 614, integrators 616, and harmonic sources 618. The harmonic detectors 614, the integrators 616, and the harmonic sources 618 may be substantially similar to the harmonic detectors 314, the integrators 316, and the harmonic sources 318 of FIG. 3, or the harmonic detectors 402, the integrators 404, and the harmonic sources 406 of FIG. 4. In a further embodiment, the gain of the harmonic detectors 614 may be calculated according to Equation 3, and the combined gain of the harmonic detectors 614 and the harmonic sources 618 may be calculated according to Equation 6. The gains Kd and Ks may be optimized according to known feedback loop stability and optimization techniques, or if Kd and Ks are known values, the gain of the integrators 616 may be selected, chosen, or optimized according to known feedback loop techniques.

An estimate calculation of the time constant, Tc, for the cancellation system is possible by knowing that the time constant of a closed loop system with a single integrator at the gain of the frequency cancelled is one divided by the open loop gain around the integrator, or:

$$Tc = \tfrac{1}{2} * Kd * Ks * /\text{Plant} * (1 - \text{Plant} * \text{Compensator}) \qquad \text{Equation 7}$$

Although the description of the present invention has utilized various embodiments, it will be recognized that the present invention is not limited to the specific embodiments described. Rather, the present invention encompasses all variants incorporating the essence of the ideas presented in the above description.

What is claimed is:

1. A non-transitory computer readable medium programmed with operations for repeatable runout signal cancellation, the operations of the computer readable medium comprising:
    receiving a position error signal from a plant;
    calculating a position compensated signal based on the position error signal;
    calculating one or more cancellation signals based on the position error signal, the cancellation signals having a gain calculated based on one or more mathematical equations by modeling the position error signal, the plant, the position compensated signal, and the one or more cancellation signals as a feedback loop, and further configured to cancel one or more repeatable runout components from the position error signal when combined with the position compensated signal;
    combining the position compensated signal and the cancellation signals into a position command signal; and
    sending the position command signal to the plant.

2. The computer readable medium of claim 1, further comprising:
    detecting one or more repeatable runout components from the position error signal; and
    multiplying each of the repeatable runout components separately with the position error signal.

3. The computer readable medium of claim 2, further comprising integrating each of the multiplied signals.

4. The computer readable medium of claim 3, further comprising:

calculating one or more source signals at the phase of the position error signal and at the frequency of one or more of the repeatable runout components; and multiplying each of the integrated signals separately with separate source signals to form the cancellation signals.

5. The computer readable medium of claim 1, further comprising a sine stage and a cosine stage.

* * * * *

UNITED STATES PATENT AND TRADEMARK OFFICE
CERTIFICATE OF CORRECTION

PATENT NO. : 7,903,367 B2  
APPLICATION NO. : 12/462650  
DATED : March 8, 2011  
INVENTOR(S) : Boyd Norvell Shelton Page 1 of 1

It is certified that error appears in the above-identified patent and that said Letters Patent is hereby corrected as shown below:

On the cover page, left column, below

"Prior Publication Data
US 2007/0106684 A1    May 10, 2007"

the text

--(63)    Related U.S. Application Data
Continuation of Application No. 11/598,181, filed November 13, 2006, now U.S. Patent No. 7,688,541.-- should be inserted.

Column 1, below the title in lines 1 and 2, the text

--This is a Continuation Application of U.S. Application No. 11/598,181, filed November 13, 2006, now U.S. Patent No. 7,688,541.-- should be inserted.

Signed and Sealed this
Twentieth Day of December, 2011

David J. Kappos
*Director of the United States Patent and Trademark Office*